Figure 1:
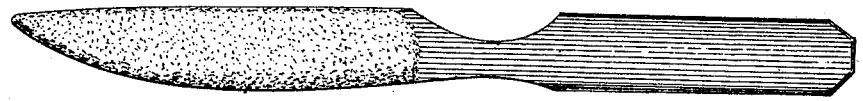
Figure 2:

C. L. Roorbach,
Removing Corns.

No. 110,162.   Patented Dec. 13, 1870.

Witnesses
Harry King
D. J. Peyton

Inventor.
Charles L. Roorbach
by John A. Gildersleeve his Atty.

UNITED STATES PATENT OFFICE.

CHARLES L. ROORBACH, OF ST. CLAIR, PENNSYLVANIA.

IMPROVEMENT IN IMPLEMENTS FOR REMOVING CORNS, BUNIONS, &c.

Specification forming part of Letters Patent No. 110,162, dated December 13, 1870.

*To all whom it may concern:*

Be it known that I, CHARLES L. ROORBACH, of St. Clair, in the county of Schuylkill and State of Pennsylvania, have invented a new and useful Exterminator for Corns, Bunions, &c.; and I do hereby declare the following to be a clear and exact description of the nature thereof, sufficient to enable others skilled in the art to which my invention appertains to fully understand and use the same, reference being had to the accompanying drawing, making part of this specification, in which the figures are side and end views.

My invention consists in a composition of matter which is adapted to be applied to a suitable handle or other implement for manipulating purposes, and to harden on drying, so as to produce a body with a roughened surface having the quality of a file or fine rasp, which, when worked on or against a corn, bunion, inverted nail, wart, or otherwise, shall easily and gradually wear away the same, and owing to the nature of the composition, the operation is soothing in its effect and unproductive of pain to the patient, the corn or otherwise being thus gently destroyed.

In carrying out my invention I may take shellac, emery, alcohol, vermilion, which, or their equivalents, are combined together in proper proportions. The paste thus produced may be applied to a piece of wood, metal, rubber, or other article, so as to coat it, and leave at one end a handle for convenient operation. When the paste is dry, it becomes quite hard, and produces a file or rasp surface.

In using my invention I work or rub the device over and on the corn or otherwise, thus gradually filing or wearing it away. The surface, though rough, is not irritative. The moisture of the corn or bunion assists in the attritive operation, which thereby becomes soothing and gentle in its result.

Vermilion may be applied to the composition as a coloring-matter to produce a nice finish and appearance; but it also serves to smoothen the surface of the exterminator, and thus lessen the harsh effects of the emery.

Having thus described my invention, what I claim as new, and desire to secure by Letters Patent, is—

1. A composition of matter forming a body with a roughened surface, for rubbing or filing corns, &c., and thus exterminate them.

2. The improved corn-file herein described, produced by the combination of a body of wood or other material as a base, and a coating compound of the character described, all substantially as set forth.

The above signed by me this 23d day of November, 1870.

CHARLES L. ROORBACH.

Witnesses:
WM. G. BURWELL,
MARTIN TEMPEST.